US011441572B2

(12) United States Patent
Solomon et al.

(10) Patent No.: US 11,441,572 B2
(45) Date of Patent: Sep. 13, 2022

(54) IMPELLER DESIGN AND MANUFACTURING METHOD WITH PENTAGONAL CHANNEL GEOMETRY (71) Applicant: Hamilton Sundstrand Corporation, Charlotte, NC (US)

(72) Inventors: Andrew W. Solomon, Windsor, CT (US); Joseph Samo, Johnston, IA (US); Thomas J. Ocken, Des Moines, IA (US); Jacob Greenfield, Granger, IA (US); John Sypek, Chicopee, MA (US); Jordan Christopher Pugliese, Woodstock, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 17/000,739

(22) Filed: Aug. 24, 2020

(65) Prior Publication Data
US 2022/0056921 A1 Feb. 24, 2022

(51) Int. Cl.
F04D 29/24 (2006.01)
F04D 29/00 (2006.01)
(Continued)

(52) U.S. Cl.
CPC ............ *F04D 29/242* (2013.01); *B22F 3/105* (2013.01); *B22F 3/24* (2013.01); *B22F 5/009* (2013.01);
(Continued)

(58) Field of Classification Search
CPC .... F04D 29/242; F04D 29/281; F04D 29/023; F04D 29/026; F04D 29/162; F04D 29/007; F01D 5/043; F01D 5/34; F01D 5/048; F05D 2230/10; F05D 2230/31; F05D 2230/90; F05D 2240/31; F05D 2240/35;
(Continued)

(56) References Cited

U.S. PATENT DOCUMENTS 8,727,729 B2 5/2014 Noronha et al.
9,868,155 B2 1/2018 Gerber et al.
(Continued)

FOREIGN PATENT DOCUMENTS

EP 2746589 A2 6/2014
WO 2008087830 A1 7/2008

OTHER PUBLICATIONS

Extended European Search Report for EP Application No. 21178149. 7, dated Dec. 10, 2021, 11 pages.

*Primary Examiner* — Eric J Zamora Alvarez
(74) *Attorney, Agent, or Firm* — Kinney & Lange, P.A.

(57) ABSTRACT

An impeller includes a body with an interior channel extending through the body along a centerline axis of the impeller. A plurality of blades is connected to the body on a forward end of the impeller centerline axis. The plurality of blades surrounds the interior channel and is fluidly connected to an array of inlets. An array of pentagonal channels extends through the body and radially outward in a spiral pattern. Each pentagonal channel is fluidly connected to a corresponding vane inlet and a corresponding pentagonal-shaped outlet. Each channel maintains a pentagonal cross-section shape from the inlet to the outlet. Each downward-sloping face of the cross section is more than 35 degrees from a horizontal plane perpendicular to the centerline axis of the impeller.

20 Claims, 6 Drawing Sheets (51) Int. Cl.
   *B33Y 10/00* (2015.01)
   *B33Y 80/00* (2015.01)
   *F04D 29/02* (2006.01)
   *F04D 29/22* (2006.01)
   *B22F 3/105* (2006.01)
   *B22F 3/24* (2006.01)
   *B22F 5/00* (2006.01)
   *F02C 7/22* (2006.01)
   *B33Y 40/20* (2020.01)
   *B22F 10/10* (2021.01)

(52) U.S. Cl.
   CPC .............. *F02C 7/22* (2013.01); *F04D 29/007* (2013.01); *B22F 10/10* (2021.01); *B22F 2003/242* (2013.01); *B22F 2003/247* (2013.01); *B33Y 10/00* (2014.12); *B33Y 40/20* (2020.01); *B33Y 80/00* (2014.12); *F05D 2230/10* (2013.01); *F05D 2230/31* (2013.01); *F05D 2230/90* (2013.01); *F05D 2240/31* (2013.01); *F05D 2240/35* (2013.01); *F05D 2250/131* (2013.01); *F05D 2250/15* (2013.01); *F05D 2300/516* (2013.01)

(58) Field of Classification Search
   CPC ........... F05D 2250/131; F05D 2250/15; F05D 2300/516; F02C 7/22; B22F 3/105; B22F 3/24; B22F 5/009; B22F 10/10; B22F 2003/242; B22F 2003/247; B33Y 10/00; B33Y 80/00; B33Y 40/20
   See application file for complete search history.

(56) References Cited

U.S. PATENT DOCUMENTS

| | | |
|---|---|---|
| 11,220,922 B1* | 1/2022 | Barton .................. F01D 9/026 |
| 2009/0185906 A1 | 7/2009 | Taylor |
| 2013/0251516 A1 | 9/2013 | Tanaka et al. |
| 2017/0107821 A1 | 4/2017 | Schwarz |
| 2018/0266433 A1 | 9/2018 | Iurisci et al. |
| 2018/0355883 A1 | 12/2018 | Pulnikov |
| 2019/0003322 A1 | 1/2019 | Rettberg et al. |
| 2019/0210111 A1 | 1/2019 | Army et al. |
| 2020/0040739 A1 | 2/2020 | Notarnicola et al. |
| 2020/0240279 A1 | 7/2020 | Wedig et al. |

* cited by examiner

IMPELLER DESIGN AND MANUFACTURING METHOD WITH PENTAGONAL CHANNEL GEOMETRY

BACKGROUND

The present disclosure relates generally to impellers, and more specifically to impellers used in gas turbine engines.

In existing gas turbine engines, an impeller can be a rotating component of a fuel pump used to pressurize and thereby increase flow of a fluid.

Additive manufacturing is a method of manufacturing that creates an object by depositing material in a layer-by-layer process. Traditionally, many impellers include geometry with overhang angles that additive manufacturing is incapable of replicating. Existing impeller designs are therefore often manufactured by a casting process. This casting process can contribute to long lead times, slowing the overall pace of engine manufacture. Additionally, some other possible methods of manufacture, such as brazing, require extensive non-destructive quality assurance testing, further increasing the total production time and cost associated with each impeller.

SUMMARY

An impeller includes a body with a centerline axis and an interior chamber extending along the centerline axis. The interior chamber is configured to mate with a rotating element. A plurality of vanes is configured to rotate about the centerline axis of the impeller to induce fluid, such as fuel, into an array of inlets that is fluidly connected to the plurality of blades. The array of inlets is fluidly connected to an array of pentagonal channels that radiate outward through the body of the impeller in a spiral pattern. The array of pentagonal channels terminates in an array of corresponding pentagonal outlets. Each of the pentagonal channels in the array of pentagonal channels maintains a pentagonal cross section along its path through the body.

In some embodiments, a shroud may extend outward radially from the body of the impeller. In such a case, the pentagonal channels can extend symmetrically outward in a spiral pattern through the shroud and terminate in an array of pentagonal outlets on a radially outward wall of the shroud perpendicular to the centerline axis of the impeller.

In some embodiments, the impeller may have a plurality of annuli, configured to couple with external elements. These annuli connect to and extend from the body along the centerline axis.

A method of making an impeller comprising forming the body of the impeller on a build plate by means of a layer-by-layer additive manufacturing process. The body of the impeller includes an interior channel running forward to aft along a centerline axis, and a plurality of blades fluidly connected to pentagonal channels. These pentagonal channels extend symmetrically outward throughout the body in a spiral pattern.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

This disclosure is directed to a design for an impeller possessing unique geometry, and to a method of manufacturing that impeller via a layer-by-layer additive manufacturing process. Additive manufacturing processes have certain inherent limitations. For example, overhang angles lower than 35 degrees between a downward sloping surface (relative to a build platform) and a horizontal plane perpendicular to the build direction of the workpiece can lack sufficient support to be buildable, resulting in unreliable or flawed manufacture. Traditional impeller designs commonly include surfaces arranged at such overhang angles below 35 degrees. Traditional non-additive methods of impeller manufacture can contribute to low supply-base security or increased cost due to long lead times and expensive non-destructive quality assurance testing. An alternative design lacking unworkable overhang angles would allow for additive manufacturing of impellers, thereby providing a solution to at least one of these challenges.

The pentagonal channel structure of this disclosure provides several advantages over other geometries which would comport to additive manufacturing limitations, such as a triangular channel structure. For example, triangular channels must alternate vertical orientations to efficiently use space. Pentagonal channels can be included in greater channel density without alternating, and consequently do not have this limitation. Additionally, compared to other potential channel geometries, a greater portion of pentagonal channels' surfaces can be oriented vertically or horizontally, which improves fluid flow and increases the impeller's mechanical efficiency.

Figure 1:
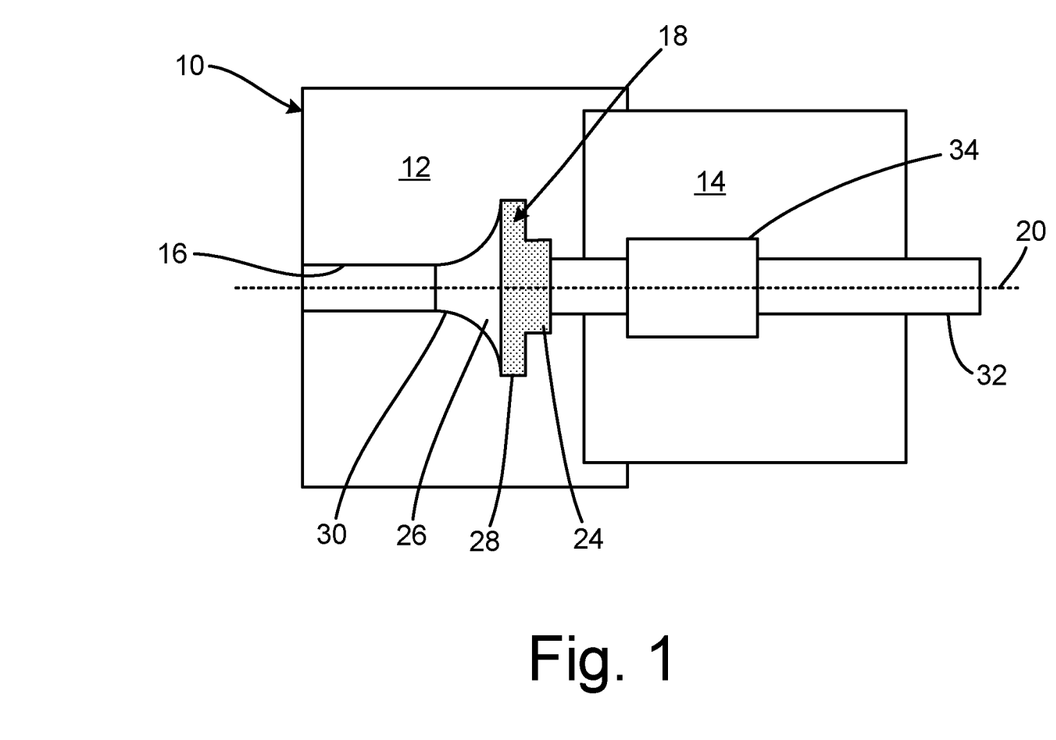
FIG. 1 is a block diagram of a system with a fuel pump that includes an impeller.

FIG. 1 is a system view block diagram of fuel pump 10 and shows main housing 12, mount housing 14, fluid inlet 16, and impeller 18. Impeller 18 is disposed along centerline axis 20, and includes first annulus 24 (including shroud 26 with radially outward wall 28), second annulus 30, drive shaft 32, and bearing 34.

Fuel pump 10 is an apparatus that induces fluid flow in a particular direction. Main housing 12 is primary structure that contains and supports impeller 18 and fluid inlet 16. Mount housing 14 is the structure that contains drive shaft 32 and bearing 34. Impeller 18 is a rotating component of fuel pump 10 that pressurizes fluid to increase fluid flow.

Impeller 18 can be manufactured additively via laser powder bed fusion ("LPBF") additive manufacturing or analogous methods. LPBF is performed by arranging a large bed of metallic powder on a build plate. A laser is used to apply precisely directed heat to the powder bed, melting the powder at desired locations and solidifying it into a desired structure. New layers of fresh powder are successively applied as the process is repeated until the desired structure is created. Impeller 18 could also be manufactured via electron beam additive manufacturing. Electron beam additive manufacturing functions similarly to LPBF with the exception that the heat source used to melt the metallic powder is an electron beam inside a vacuum instead of a laser. Likewise, impeller 18 could be manufactured using binder-jetting additive manufacturing. Binder-jetting additive manufacturing is performed by arranging a large bed of metallic powder on a build plate and moving a print head across the powder bed while dispensing a liquid binding agent into the powder bed, thereby solidifying the powder. As in other additive manufacturing processes, fresh layers of powder are applied iteratively to form a desired structure in all of these methods, unsolidified powder is removed.

Fluid inlet 16 is an upstream component that allows fluid to flow into impeller 18. Centerline axis 20 is an axis running passing through a radial center of impeller 18 from forward to aft. First annulus 24 is a cylindrical or tubular extension disposed about centerline axis 20 and is configured to couple to drive shaft 32. Shroud 26 is a circular housing structure extending axially from impeller 18 relative to centerline axis 20 that curves to form radially outward wall 28 perpendicular to centerline axis 20. Second annulus 30 is a cylindrical or tubular extension on the forward end of centerline axis 20 and is configured to couple with fluid inlet 16. Drive shaft 32 is a rotating element that drives rotation of impeller 18. Bearing 34 reduces friction caused by rotation induced by drive shaft 24 and restrains movement to one direction.

Main housing 12 is connected to mount housing 14 and to fluid inlet 16. Main housing 12 is disposed along a housing axis extending in a fluid flow direction from a top end to a bottom end of the main housing. In one example, main housing 12 is mounted to a portion of a gas turbine engine and is fixedly attached via brackets to main housing 12. Mount housing 14 is connected to main housing 12 and encloses drive shaft 32 and bearing 34. In one example, mount housing 14 is fixedly attached to a gas turbine engine via brackets to mount housing 14. Fluid inlet 16 is connected to impeller 18 and to second annulus 30. Impeller 18 is connected to first annulus 24, shroud 26, second annulus 30, fluid inlet 16, and drive shaft 32. Centerline axis 20 runs along a radial center of impeller 18. In some embodiments impeller 18 may share an axis with the housing axis. First annulus 24 is connected to drive shaft 32 on the aft end of first annulus 24. In the example shown in FIG. 1, a forward direction is to the left of FIG. 1 and an aft direction is towards the right of FIG. 1. Shroud 26 is connected to impeller 18 and radially outward wall 28. Similarly, to first annulus 24 and second annulus 30, shroud 26 connects seamlessly to impeller 18 as both shroud 26 and impeller 18 are additively manufactured from the same material composition. Radially outward wall 28 is connected to shroud 26 and pentagonal outlets 36. Second annulus 30 is connected to fluid inlet 16 on the forward end of the centerline axis 20. Drive shaft 32 is connected to first annulus 24. Bearing 34 is connected to drive shaft 32.

The present disclosure is directed generally to impeller 18 disposed within fuel pump 10, which drives fluid in a pumping direction. Fuel pump 10 includes main housing 12 with fluid inlet 16 and impeller 18 (as described above), as well as a portion of drive shaft 32 connected to mount housing 14. Mount housing 14 contains a portion of drive shaft 32 and bearing 34. Mount housing 14 is connected to main housing 12. Fluid inlet 16 receives fluid into impeller 18. Impeller 18 pressurizes fluid received from fluid inlet 16 via rotation induced by drive shaft 32. First annulus 24 couples with drive shaft 32 to rotate impeller 18 (first annulus 24, shroud 26, radially outward wall 28, and second annulus 30.) Shroud 26 connects to radially outward wall 28.

Figure 2:
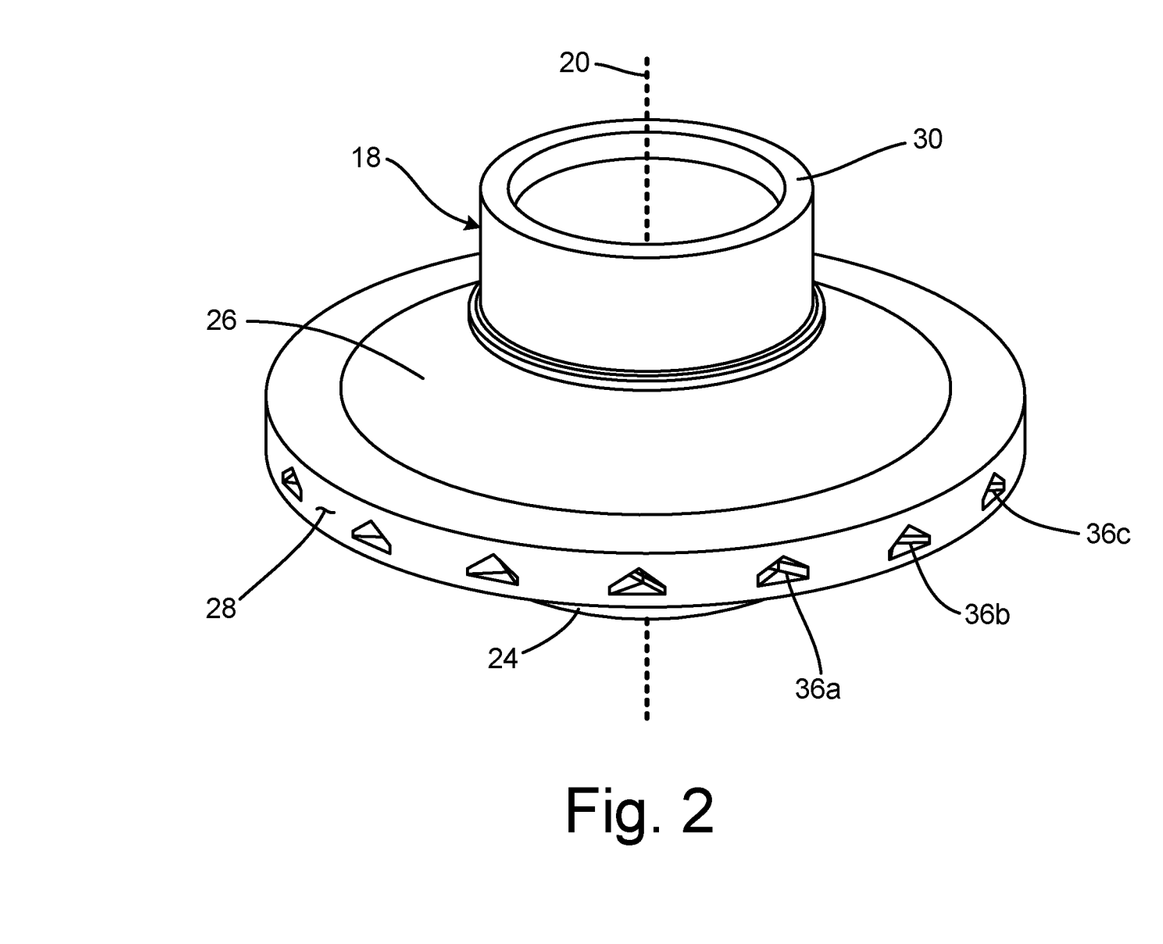
FIG. 2 is a front elevation view of the impeller and shows a plurality of pentagonal outlets and first and second annuli.

FIG. 2 is a front elevation view of impeller 18, with centerline axis 20, first annulus 24, shroud 26, radially outward wall 28, and an array of pentagonal outlets 36 (including individual outlets 36a, 36b, 36c). In the example shown in FIG. 2, a forward direction is in an upward direction of FIG. 2 and an aft direction is towards the bottom of FIG. 2.

Fluid flows through shroud 26 to radially outward wall 28. Radially outward wall 28 contains pentagonal outlets 36 which allow fluid to exit impeller 18 after flowing through shroud 26. Second annulus 30 couples with fluid inlet 16 allowing impeller 18 to receive fluid. Drive shaft 32 rotates and couples to first annulus 24 to cause impeller 18 (including shroud 26, radially outward wall 28, and second annulus 30) to rotate. Bearing 34 connects to drive shaft 32 and reduces friction generated by rotation caused by drive shaft 32. Pentagonal outlets 36 allow fluid to exit impeller 18 after flowing through shroud 26.

Figure 3:
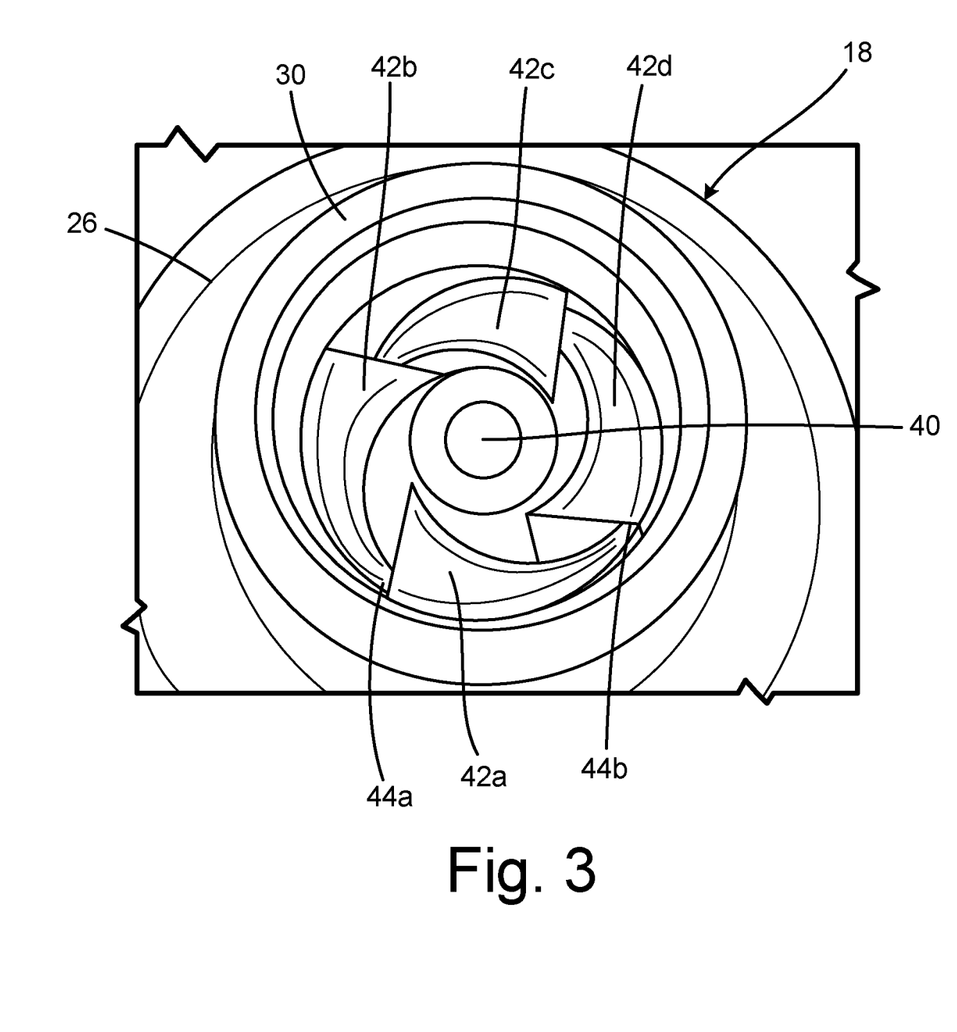
FIG. 3 is a top-down view of the impeller and shows a plurality of blades within an annulus.

FIG. 3 is a top down view of impeller 18 and shows impeller 18, shroud 26, second annulus 30, interior channel 40, multiple blades 42 (including individual blades 42a, 42b, 42c, 42d), and an array of inlets 44 (including individual inlets 44a, 44b).

Interior channel 40 is an inner radial surface forming a channel along centerline axis 20 of impeller 18. Blades 42 are a group of blades extending radially outward from interior channel 40 in a spiral pattern, wherein blades 42 terminate when meeting second annulus 30. Inlets 44 are a group of entry ports for a fluid and that are arranged around the perimeter of blades 42.

Second annulus 30 surrounds blades 42 (including individual blades 42a, 42b, 42c, 42d). Interior channel 40 is connected to and passes through impeller 18. Interior channel 40 couples with drive shaft 32 to prevent flow of fluid, excess fluid attempting to travel along centerline axis 20 exits via an array of pressure balance holes 48 (shown in FIG. 5). Blades 42 are connected to impeller 18 and surround interior channel 40. In this example, blades 42 extend symmetrically outward in a spiral pattern from interior channel 40. Blades 42 are symmetrical in that blades 42 are distributed rotationally symmetrically about centerline axis 20. Blades 42 are connected to and surrounded by second annulus 30, wherein second annulus 30 forms a perimeter around blades 42. Inlets 44 are connected to impeller 18 and fluidly connected to pentagonal outlets 36.

Interior channel 40 couples with drive shaft 32 to rotate impeller 18. Blades 42 rotate when impeller 18 couples with drive shaft 32. When blades 42 rotate fluid moves fluid inlet 16 and second annulus 30 to inlets 44. Inlets 44 pressurize fluid when rotated and moves through shroud 26.

Shroud 26 is necessary to prevent blades 42 from being exposed. Shrouded impellers reduce fluid leakage from blades and in general provide higher mechanical efficiency. However, non-shrouded impellers generally have lower mass compared to shrouded impellers due to the omission of the shroud.

Figure 4:
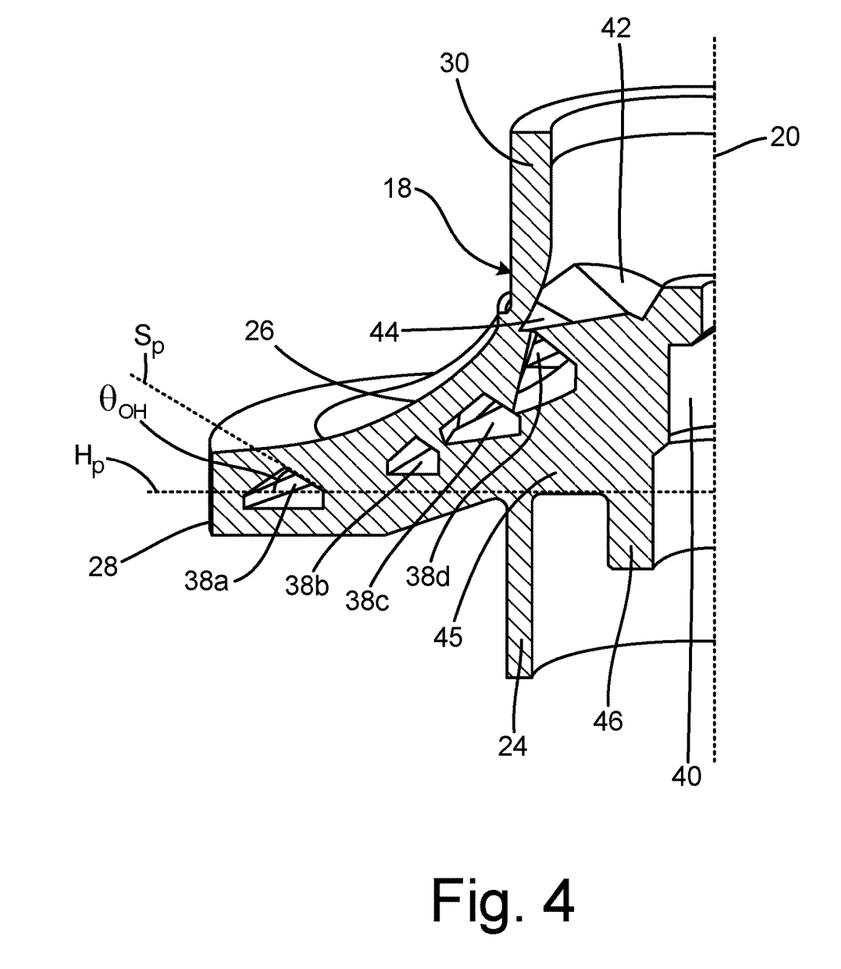
FIG. 4 is a cross-sectional view of the impeller taken along the center line of FIG. 2 and shows an array of pentagonal channels disposed in a body of the impeller and an inner radial surface forming an interior channel through the center of the impeller.

FIG. 4 is a cross-section view of impeller 18 and shows impeller 18, first annulus 24, shroud 26, radially outward wall 28, second annulus 30, pentagonal channels 38 (including individual channels 38a, 38b, 38c, and 38d), interior channel 40, blades 42, inlets 44, body 45, inner annulus 46, horizontal plane $H_p$, downward slope $S_p$, and overhang angle $\theta_{OH}$. In the example shown in FIG. 4, a forward direction is in an upward direction of FIG. 4 and an aft direction is towards the bottom of FIG. 4.

In this example, pentagonal channels 38 are a group of pentagonal-shaped channels that extend symmetrically outward in a spiral pattern through body 45 and shroud 26. Pentagonal channels 38 are distributed rotationally symmetrically about centerline axis 20. Horizontal plane $H_p$ is a horizontal plane perpendicular to the centerline axis 20 extending from centerline axis 20 through pentagonal channels 38 and intersecting with downward slope downward slope $S_p$ at pentagonal channels 38. Downward slope $S_p$ is the downward sloping surface forming one half of the upper triangular portion of each pentagonal channel. Overhang angle $\theta_{OH}$ is the angle between horizontal plane $H_p$ and downward slope $S_p$. In this example, overhang angle $\theta_{OH}$ can be at least 35 degrees.

Pentagonal channels 38 are fluidly connected to pentagonal outlets 36 and inlets 44. Body 45 is connected to fluid inlet 16, impeller 18, first annulus 24, shroud 26, second annulus 30, and drive shaft 32. Body 45 is connected to fluid 16 inlet via fluid inlet 16 coupling with second annulus 30. Body 45, first annulus 24 and second annulus 30 together form a unitary structure formed monolithically and seamlessly connected via additive manufacturing. In one example, body 45 of impeller 18 has a center disposed along the housing axis. In some examples, shroud 26 is connected to impeller 18 and radially outward wall 28. Body 45 allows fluid to flow through body 45 to shroud 26. Body 45 also supports and defines an array of fluidic channels passing through body 45. Similarly to first annulus 24 and second annulus 30, shroud 26 connects seamlessly to body 45 as shroud 26 and body 45 are additively manufactured from the same material composition. Inner annulus 46 is connected to body 45 on the aft end of centerline axis 20 and is surrounded by first annulus 24.

Horizontal plane $H_p$ is perpendicular to centerline axis 20 and extends from centerline axis 20 through pentagonal channels 38, with an individual horizontal plane $H_p$ running through each individual pentagonal channel. Downward slope $S_p$ extends along the downward sloping surface of the triangular top portion of each pentagonal channel. Downward slope $S_p$ intersects with horizontal plane $H_p$ when horizontal plane $H_p$ extends through pentagonal channels 38. Overhang angle $\theta_{OH}$ is the angle between horizontal plane $H_p$ and downward slope, it can be at least 35 degrees. Put another way, each individual pentagonal channel includes five sides: which in this example can be described as a horizontal side, two vertical sides, and two sloping sides. In this example, the horizontal side can extend radially with respect to centerline axis 20, while both vertical sides can extend axially with respect to centerline axis 20, connecting with the vertical side at right angles. Here, one of the vertical sides can define an outer radial extent of the horizontal side, while the other vertical side can define an inner radial extent of the horizontal side. The sloping sides each abut one another and a respective one of the vertical sides. In this example, the angle between a sloping side and a vertical side can be at least 125 degrees.

In another example, the horizontal side can extend in a non-radial direction with respect to centerline axis 20, while both vertical sides can extend in a non-axial direction with respect to centerline axis 20, connecting with one or both of the vertical sides at non-perpendicular angles (e.g., acute or obtuse). In other examples, the five sides can include a bottom side, two sidewalls, and two sloping side, such that the bottom side extends along a non-radial direction with respect to centerline axis 20 and/or the two sidewalls can extend in a non-axial direction with respect to centerline axis 20. In such an example, one or both of the sidewalls can connect with the bottom side as either right (i.e., perpendicular) or non-right (i.e., non-perpendicular) angles. Pentagonal channels 38 pressurize fluid as the fluid flows through pentagonal channels 38 when impeller 18 rotates thereby increasing the flow of the fluid. Inner annulus 46 couples to drive shaft 32 to cause impeller 18 to rotate.

Impeller channels with rectangular cross-sections are difficult to manufacture via an additive manufacturing process because rectangular cross-sections contain overhang angles between a downward sloping surface and a horizontal plane that is less than 35 degrees. But more rectangular cross sections provide better laminar flow and a higher possible channel to space density. Such overhang angle geometry provides insufficient support for an additively manufactured surface. In contrast to rectangular channels, impeller 18 of this disclosure contains no such overhang angle geometry. The relationship between horizontal plane $H_p$, downward slope $S_p$, and overhang angle $\theta_{OH}$ is such that every potential overhang angle is at least 35 degrees. This allows for pentagonal channels 38, and thus all of impeller 18, to be additively manufactured.

In some embodiments, overhang angles can be at least 45 degrees. Because greater overhang angles are less difficult to additively manufacture, permitting overhang angles to be at least 45 degrees thereby allows for greater ease of manufacturing. Shallower angles, although more difficult to produce with requisite precision and smoothness, provide a closer approximation of a rectangular cross-section for higher flow area density within the part. The geometry of overhang angle $\theta_{OH}$ approximates rectangular channels while still allowing for additive manufacture.

Pentagonal channels, due to more closely resembling rectangular channels than other possible channel geometries, possess many of the advantages of rectangular channels. Functionally, this allows pentagonal channels to serve as an approximation for rectangular channels. The pentagonal geometry of impeller 18 provides space efficiency approximating conventional rectangular cross-sectional geometry, without requiring shapes that cannot be reliably formed via additive manufacturing techniques, i.e. rectangles. This high space efficiency keeps impeller weight low by dedicating as great a portion of the impeller as possible to the intended purpose of fluid pumping. Some existing shaped channel designs for additive manufacturing use alternating vertical orientations, i.e. adjacent channels must have alternating base-up vs. base-down orientations) to achieve similar levels of space efficiency. However, these alternating arrangements of vertical orientations can increase fluid turbulence and/or decrease the mechanical efficiency of the impeller.

Additionally, pentagonal channels have a greater portion of their passage perimeter in either a horizontal or vertical orientation, allowing for smoother manufacturing. A horizontal or vertical orientation provides for a better surface finish on an additively manufactured surface, and this better surface finish further decreases fluid turbulence thereby increasing the mechanical efficiency of the impeller. Existing shaped channel designs have the further disadvantage of requiring significant alterations to traditional blade geometry compared to existing impellers. Pentagonal channels allow for already existing blade geometry to be used.

Figure 5:
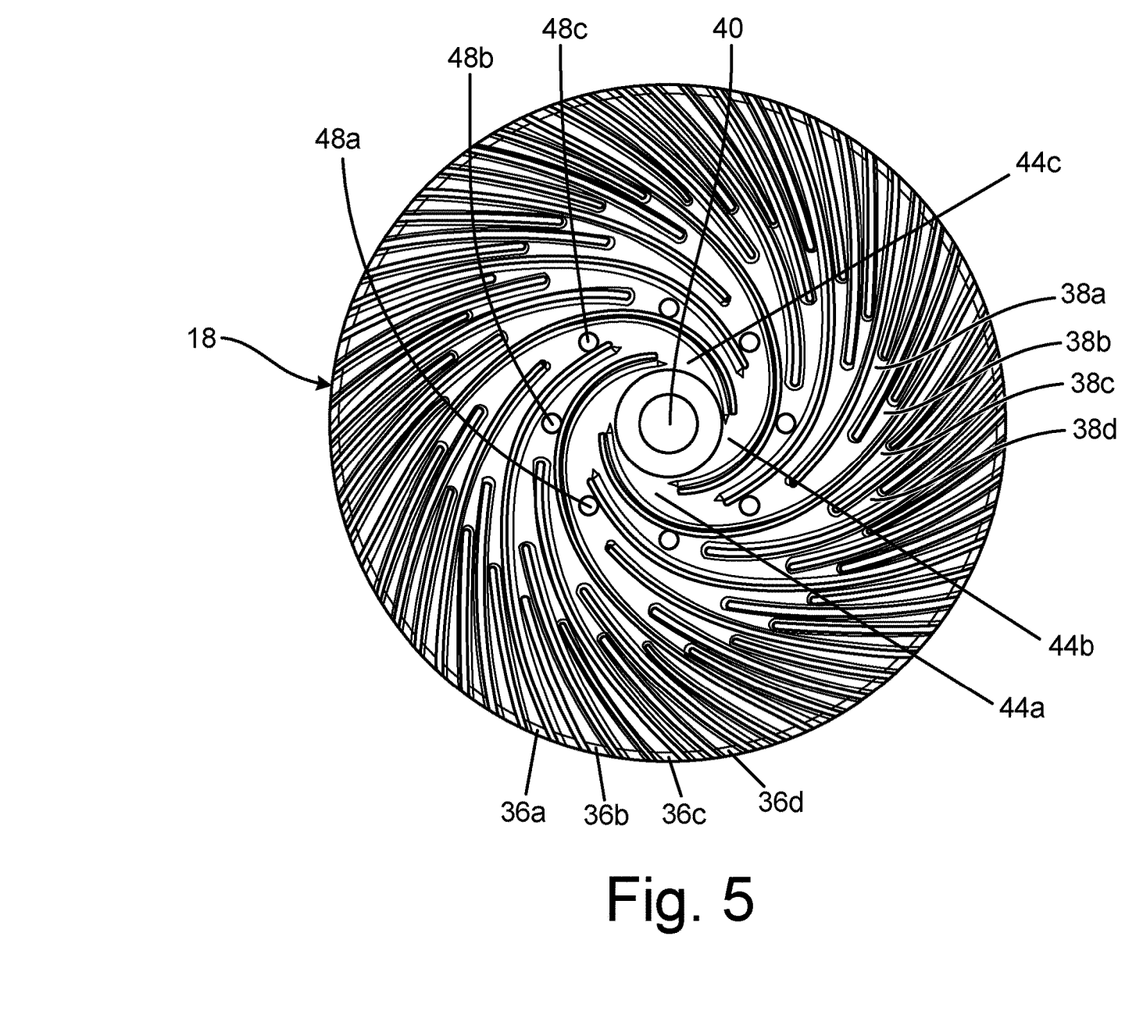
FIG. 5 is a top down view of the interior of the impeller's body and shows an array of channels radiating outward in a spiral pattern from the impeller's center.
Figure 6:
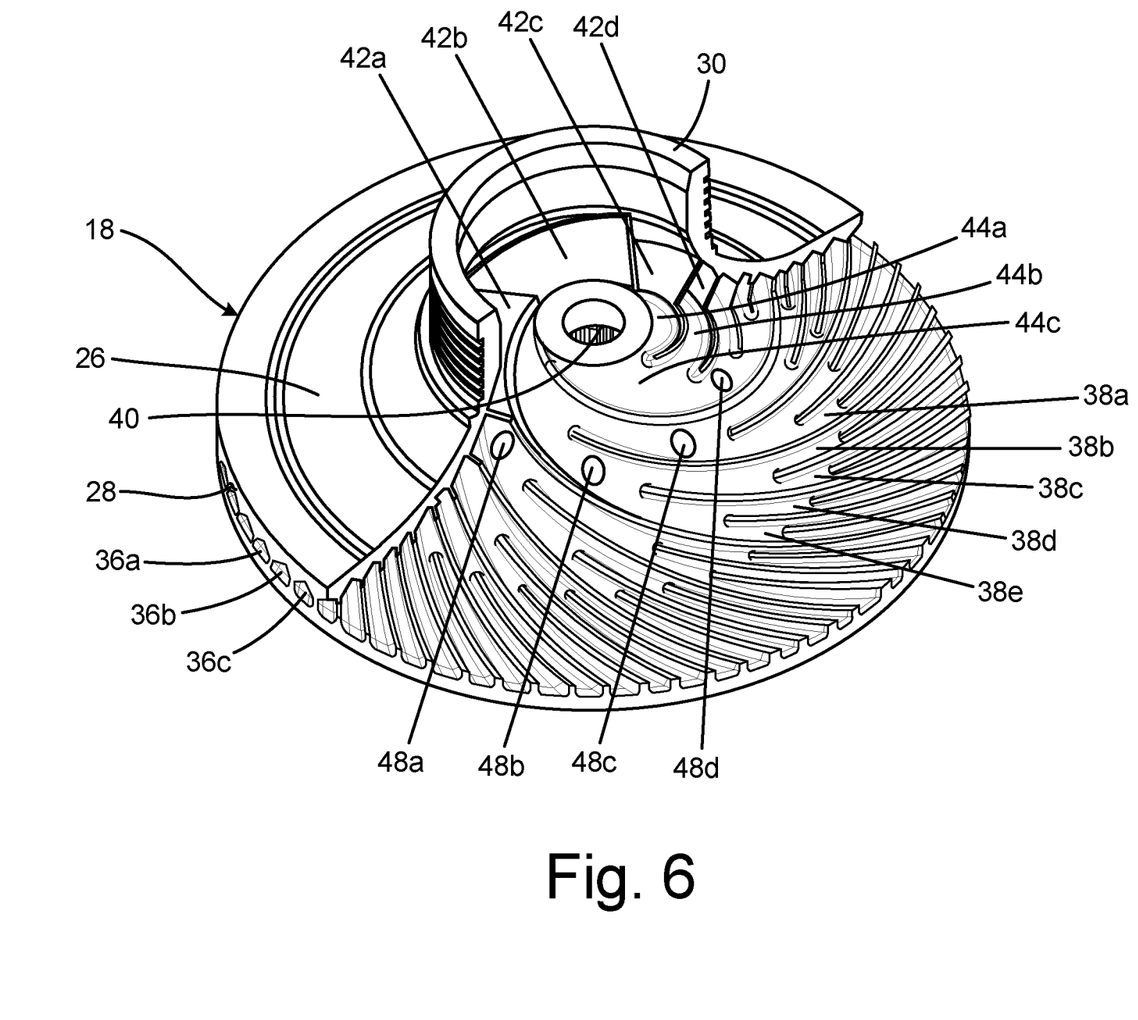
FIG. 6 is a view of the impeller with sections of its shroud removed and shows the internal pathways of pentagonal channels of the impeller.

FIG. 5 is a top down cutaway view of impeller 18 and shows impeller 18, pentagonal outlets 36 (including individual outlets 36a, 36b 36c, and 36d), pentagonal channels 38 (including individual channels 38a, 38b, 38c, 38d), interior channel 40, inlets 44 (including individual inlets 44a, 44b and 44c) and pressure balance holes 48 (including individual pressure balance holes 48a, 48b, and 48c). An array of pressure balance holes 48 are arranged running through impeller 18 in a direction that is parallel to centerline axis 20 (into and out of the page as shown in FIG. 5). Inlets 44 are fluidly connected to pentagonal channels 38 and pentagonal outlets 36. Pressure balance holes 48 are connected to pentagonal channels 38. FIG. 6 is a partial cut away view of impeller 18 from a raised elevation and shows impeller 18, body 45, shroud 26, radially outward wall 28, second annulus 30, pentagonal outlets 36, pentagonal channels 38 (including individual channels 38a, 38b, 38c, 38d, and 38e), interior channel 40, blades 42 (including individual blades 42, 42b, 42c, and 42d), inlets 44 (including individual inlets 44a, 44b, and 44c), and pressure balance holes 48 (including individual pressure balance holes 48a, 48b, 48c, and 48d). FIGS. 5 and 6 will be discussed in tandem.

Inlets 44 receives fluid and transfer the fluid to array of pentagonal channels 38. Pentagonal channels 38 pressurize fluid and thereby increase the fluid's flow as impeller 18 rotates. Pentagonal channels 38 terminate at pentagonal outlets 36. Fluid exits impeller 18 at pentagonal outlets 36. Pressure balance holes 48 relieve pressure generated on impeller 18 along the centerline axis 20. Because impeller 18 often operates at high pressure, fluid entering impeller 18 through fluid inlet 16 can generate force along the centerline axis 20. This can be undesirable because such force along centerline axis 20 may displace impeller 18 from its desired position. Instead, excess pressure along centerline axis 20 is dispersed through pressure balance holes 48.

Discussion of Possible Embodiments

The following are non-exclusive descriptions of possible embodiments of the present disclosure.

A method of making an impeller. The impeller, and all its included structures, such as a body, a plurality of blades, and an array of pentagonal channels are formed using laser powder bed fusion ("LPBF") additive manufacturing. Due to its particular limitations, LPBF cannot be used to produce structures with overhang angles of less than 35 degrees. An overhang angle is the angle between a downward sloping surface and a horizontal plane. Surfaces with overhang angles of less than 35 degrees lack sufficient structural support to be freestanding, and collapse if attempted. Because of this limitation, every overhang angle within the impeller and the array of pentagonal channels is at least 35 degrees from a horizontal plane perpendicular to the centerline axis of the impeller, which allows for the use of LPBF to form the array of pentagonal channels. This method eliminates the limitations inherent to traditional methods of impeller manufacture, such as casting, which contribute to long lead times and require costly non-destructive testing to ensure quality.

The method of the preceding paragraph can optionally include, additionally and/or alternatively, any one or more of the following steps, features, configurations and/or additional components.

A plurality of annuli can be formed connected to the body of the impeller and can be configured to mate with outside elements.

A shroud can be formed to extend axially outward from the body. In such an embodiment, the array of pentagonal channels can be formed such that the array of pentagonal channels can extend outward through the shroud in a spiral pattern through the shroud and/or terminate at the array of pentagonal outlets.

A plurality of grooves can be machine son the exterior surfaces of any annuli that can be formed on the body to allow to annuli to couple with a fluid inlet and/or a drive shaft.

The array of pentagonal channels can be formed such that each individual pentagonal channels of the array of pentagonal channels can terminate at a pentagonal shaped outlet.

The impeller and the array of pentagonal can be formed such that every overhang angle is at least 45 degrees from a horizontal plane perpendicular to the centerline axis of the impeller.

The layer-by-layer additive manufacturing process can comprise: a binder-jetting additive manufacturing process.

The layer-by-layer additive manufacturing process can comprise: an electron-beam additive manufacturing.

A wear resistant material coating can be applied following the forming of the impeller via the layer-by-layer additive manufacturing process and/or the exterior surfaces of the impeller can be machined to a roughness of 200 roughness average microinches (0.01 millimeters)

An impeller for use in a fuel pump according to an exemplary embodiment of this disclosure, among other things includes: a body, an interior channel configured to mate with a rotating element, a plurality of blades connected fluidly to a plurality of inlets, wherein the plurality of inlets are connected fluidly to an array of pentagonal channels that extend outward radially through the body of the impeller. This embodiment allows for a fluid traveling through the fuel pump, such as fuel, may travel from the plurality of blades to the plurality of inlets, to the array of pentagonal channels, and then terminate at an array of pentagonal outlets.

The impeller of the preceding paragraph can optionally include, additionally and/or alternatively, any one or more of the following features, configurations, and/or additional components.

Each individual channel of the array of pentagonal channels can include a horizontal side and/or two vertical sides connected to the ends of the horizontal side at right angles and/or a first sloping side connected to one of the vertical sides and a second sloping side which is connected to the opposing vertical side.

A shroud can extend radially outward from the body, wherein the array of pentagonal channels can extend outward radially in a spiral pattern through the shroud and/or terminate at the array of pentagonal outlets.

A plurality of annuli can connect to the body of the impeller, wherein the annuli can be configured to mate with other elements of the fuel pump.

A wear resistant coating can be applied the outer surfaces of the impeller and the impeller can be machined to a roughness of 200 roughness average microinches (0.01 millimeters)

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel pump comprising:
a main housing disposed along a housing axis extending in a fluid flow direction from a top end to a bottom end of the main housing;
a mount housing connected to and extending axially from the main housing;
a fluid inlet into the main housing;
an impeller contained within the main housing and fluidly connected to the fluid inlet, wherein the impeller comprises:
a body disposed along the housing axis;
an array of pentagonal channels extending symmetrically outward from a center of the body in a spiral pattern about the housing axis; and
wherein an overhang angle between a horizontal plane and a downward axially sloping surface defining a portion of each pentagonal channel of the array of pentagonal channels is at least 35 degrees;
a drive shaft connected to the impeller and contained within the main housing and the mount housing; and
a bearing surrounding the drive shaft and contained within the mount housing.

2. The fuel pump of claim 1, wherein each channel of the array of pentagonal channels comprises:
a bottom side extending radially with respect to the housing axis;
a first sidewall extending axially with respect to the housing axis and defining an outer radial extent of the bottom side by forming a right angle with the bottom side; and
a second sidewall extending axially with respect to the housing axis and defining an inner radial extent of the bottom side by forming a right angle with the bottom side.

3. The fuel pump of claim 1, further comprising:
a shroud extending radially outward from the body of the impeller at an angle wherein the shroud comprises a curved surface and a radially outward wall parallel to the housing axis; and
wherein the array of pentagonal channels extends symmetrically through the shroud in a spiral pattern.

4. The fuel pump of claim 1, further comprising:
a first annulus connected to the body of the impeller, the first annulus extending along a centerline axis that passes through the center of the body, wherein the first annulus is configured to mate with the drive shaft; and
a second annulus on an opposite end of the body from the first annulus, wherein the second annulus is configured to mate with the fluid inlet.

5. A method of forming an impeller, wherein the method comprises:
forming a body by layer-by-layer additive manufacturing, wherein forming the body comprises:
forming, by layer-by-layer additive manufacturing, a circular base of the body on a build plate;
forming, by layer-by-layer additive manufacturing, an interior channel extending from forward to aft along a centerline axis of the impeller that passes through a center of the body, wherein the interior channel is configured to mate with a drive shaft;
forming, by layer-by-layer additive manufacturing, an array of pentagonal channels in the body, wherein each pentagonal channel of the array of pentagonal channels extends symmetrically outward from the center of the body in a spiral pattern, wherein the array of pentagonal channels includes an array of inlets surrounding the center of the impeller, and wherein an overhang angle between a downward-sloping surface of an individual pentagonal channel and a horizontal plane extending perpendicular to the centerline axis of the impeller is at least 35 degrees; and
forming, by layer-by-layer additive manufacturing, a plurality of blades that is disposed around the interior channel, wherein the plurality of blades is fluidly connected with the array of inlets and wherein the plurality of blades extends from the body of the impeller.

6. The method of claim 5 and further comprising:
forming, by layer-by-layer additive manufacturing, a forward coupling comprising:
a first annulus extending aft along the centerline axis such that the first annulus is connected to the body; and
an inner annulus disposed within the first annulus, such that the first annulus surrounds the inner annulus; and
forming, by layer-by-layer additive manufacturing, an aft coupling comprising a second annulus along the opposite end of the centerline axis, wherein the second annulus surrounds the plurality of blades.

7. The method of claim 5, and further comprising forming, by layer-by-layer additive manufacturing, a shroud extending axially outward relative to the centerline axis from the body, wherein the array of pentagonal channels expand outward through the shroud in the spiral pattern.

8. The method of claim 5, and further comprising machining grooves into exterior surfaces of the first annulus and the second annulus such that the first annulus and the second annulus are configured to couple with a fluid inlet.

9. The method of claim 5, wherein each pentagonal channel of the array of pentagonal channels terminates at a pentagonal-shaped outlet.

10. The method of claim 5, wherein the overhang angle of each pentagonal channel is at least 45 degrees.

11. The method of claim 5, wherein the layer-by layer additive manufacturing comprises binder jetting additive manufacturing.

12. The method of claim 5, wherein the layer-by-layer additive manufacturing comprises electron beam additive manufacturing.

13. The method of claim 5, further comprising:
coating an exterior surface of the impeller with a wear resistant material; and
machining the exterior surface of the impeller to an average roughness of 200 microinches (0.01 millimeters).

14. An impeller for use in a fuel pump, wherein the impeller comprises:

a body disposed along a centerline axis of the impeller, wherein the body comprises:
  an interior channel formed by an inner radial surface of the body, wherein the interior channel surrounds a void running along the centerline axis throughout the body, wherein the interior channel is configured to mate with a rotating element;
a plurality of blades integrally formed with and connected to the body, wherein the plurality of blades is oriented in a spiral pattern around the interior channel;
a plurality of inlets connected to the body and located around a perimeter of the plurality of blades, wherein the plurality of inlets is fluidly connected to the plurality of blades allowing for fluid flow from the blades to the inlets; and
an array of pentagonal channels disposed in the body, wherein the array of pentagonal channels extends symmetrically outward in a spiral pattern through an angled surface of the body, wherein the array of pentagonal channels is fluidly connected to the plurality of inlets allowing a flow of fluid from the plurality of blades to the array of pentagonal channels.

15. The impeller of claim 14, wherein each individual pentagonal channel of the array of pentagonal channels comprises:
  a centerline axis disposed about the body of the impeller;
  a horizontal side extending radially with respect to the centerline axis;
  a first sidewall extending axially with respect to the centerline axis and defining an outer radial extent of the horizontal side by forming a right angle with the horizontal side; and
  a second sidewall extending axially with respect to the centerline axis and defining an inner radial extent of the horizontal side by forming a right angle with the horizontal side.

16. The impeller of claim 14, further comprising:
  a shroud extending radially outward from the body at an angle, wherein the shroud comprises a curved surface and a radially outward wall parallel to the centerline axis; and
  wherein the array of pentagonal channels extends symmetrically outward through the body and through the shroud in a spiral pattern.

17. The impeller of claim 14, further comprising:
  a first annulus connected to the body and extending aft on the centerline axis, wherein the first annulus is configured to mate with a rotating element;
  an inner annulus within the first annulus such that the first annulus surrounds the inner annulus; and
  a second annulus on an opposite end of the centerline axis compared to the first annulus, wherein the second annulus is configured to mate with a fluid inlet.

18. The impeller of claim 14, wherein an outer surface of the impeller is coated with a wear resistant coating.

19. The impeller of claim 14, wherein surfaces of annular extensions of the impeller are machined to an average roughness of 200 microinches (0.01 millimeters).

20. The impeller of claim 15, wherein each individual pentagonal channel of the array of pentagonal channels further comprises:
  a first sloping side abutting the first sidewall;
  a second sloping side abutting the second sidewall and the first sloping side; and
  wherein:
    the first sloping side forms an angle of at least 125 degrees with the first sidewall; and
    the second sloping side forms an angle of at least 125 degrees with the second sidewall.

* * * * *